United States Patent [19]
Thalmann et al.

[11] Patent Number: 6,106,715
[45] Date of Patent: Aug. 22, 2000

[54] MEMBRANE FILTRATION ASSEMBLY

[75] Inventors: William H. Thalmann, Clarence; Peter W. Hessinger, Burt, both of N.Y.

[73] Assignee: Infinitex Corporation, Clarence, N.Y.

[21] Appl. No.: 09/119,946

[22] Filed: Jul. 21, 1998

[51] Int. Cl.⁷ .......................... B01D 63/10; B01D 65/00
[52] U.S. Cl. .................. 210/321.83; 210/321.67; 210/356; 210/440; 210/483; 210/541; 210/456; 96/7; 55/420
[58] Field of Search .................. 210/232, 304, 210/321.6, 321.74, 321.83, 440, 456, 493.4, 497.1, 541, 321.67, 354, 356, 483, 490; 96/7; 55/462, 520

[56] References Cited

U.S. PATENT DOCUMENTS

| | | | |
|---|---|---|---|
| 3,556,302 | 1/1971 | Agranat | 210/356 |
| 3,709,367 | 1/1973 | Martinez | 210/541 |
| 3,743,098 | 7/1973 | Martinez | 210/321.74 |
| 3,963,621 | 6/1976 | Martinez | 210/321.74 |
| 4,035,305 | 7/1977 | Miller et al. | 210/321.74 |
| 4,083,780 | 4/1978 | Call | 210/321.74 |
| 4,213,858 | 7/1980 | Boberg et al. | 210/321.83 |
| 5,639,365 | 6/1997 | McLoughlin et al. | 210/356 |
| 5,891,334 | 4/1999 | Gundrum et al. | 210/321.83 |

*Primary Examiner*—Joseph W. Drodge
*Attorney, Agent, or Firm*—Crossetta & Associates

[57] ABSTRACT

A novel spiral membrane arrangement is disclosed comprising opposing elongate filtration membrane units, spiraled about a base axis and separated by a novel lattice separator having spaced apart elongate primary laths which form fluid passageways, bridged by cross laths arranged to form a plurality of fluid shears spaced along the passageways which divide, deflect and/or disrupt gross fluid flow through the passageway, directing fluid against the membrane surface and creating a self cleaning functionality which improves the efficiency and the life of the life of the membrane arrangement.

20 Claims, 5 Drawing Sheets

MEMBRANE FILTRATION ASSEMBLY

FIELD OF THE INVENTION

This application relates to filter assemblies for the separation of water from mixtures with larger molecule liquids such as oils, particularly to an improved design of a circular wound membrane assembly for an ultra-filtration device.

BACKGROUND OF THE INVENTION

It is not unusual to find multiple diverse instances wherein larger molecule liquids have been mixed with water and/or other smaller molecule liquids. For example, bilge water typically comprises a mixture of petroleum oil and/or other organic solvents with water, as does typical liquid waste collections from automotive repair and wash facilities, machine shops, metal stamping plants, and generally any number of industrial or repair processes wherein liquids such as water and organic materials such as oils, solvents, coolants and the like are commingled in use or collection.

There has been an increasing need for means to separate larger molecule liquids, water and/or solids mixtures so that clean water can be returned to the environment while the larger molecule liquids and/or solids can be recovered and recycled.

One device which is generally commercially available for the separation of such mixtures is an ultrafiltration device as disclosed in U.S. Pat. No. 5,069,780. In such ultra-filtration device a fluid containing mixture is directed, under pressure, to an ultra-filtration membrane. The ultra-filtration membrane preferably comprises microscopic hydrophilic pores which will allow water to pass through the membrane but resist the passage of larger sized organics such as oil, solvents and/or solids molecules. Such selective activity is a function of the membrane, achieved through a combination of membrane characteristics including pore size, liquid contact angle and liquid surface tension. The membrane is typically arranged in a cross flow configuration wherein a feed from a water/oil mixture flows across the ultrafiltration membrane at a pressure which allows water in the mixture to permeate the membrane which resisting the flow of larger molecules through the membrane.

The defining parameters of ultrafiltration devices of the type above described are generally significantly affected by the efficiency of the membrane assembly and the convenience of maintaining such efficiency. Thus, the volume of liquid flow through the device, the power efficiency of the pump enabling pressurized flow through the device and the quality of the ultra-filtration attained depends primarily upon the filtering capability of the membrane, but the ability to maintain an efficient flow of fluid along the membrane and maintain the membrane from fouling or otherwise clogging to reduce its efficiency are generally factors defined by the membrane assembly.

Maintaining the efficient flow of fluids across the membrane and reducing the tendency of the membrane from clogging can require extensive and complex periodic disassembly of the device for routine cleaning and/or maintenance and as a result such units have not enjoyed a level of commercial utility that might otherwise be expected.

It is an object of the present invention to provide a membrane assembly, particularly useful for ultrafiltration of fluids, which is convenient to connect into ultrafiltration devices, efficient in directing fluid flow across the membrane, is resistant to membrane clogging and can be easily cleaned and/or replaced in a complex ultra-filtration device. These and other objects will become apparent from the following description of the invention.

SUMMARY OF THE INVENTION

The assembly of the present invention features a novel, self cleaning spiral ultrafiltration membrane arrangement, confined in a housing having an enhanced fluid flow efficiency. The novel spiral membrane arrangement of the invention comprises one or more opposing elongate filtration membrane units, spiraled about a base axis, the windings being separated by a novel lattice separator having spaced apart elongate primary laths, bridged by cross laths.

The primary laths comprising the lattice separator are elongate elements, arranged in planes about concentric to the base axis of the spiral, which engage opposing surfaces of the same or opposing membrane units to maintain the windings and/or the units spaced from each other. The primary laths are spaced from each other and form a plurality of distinct elongate passageways between opposing membrane units which are spaced from and arranged generally in the direction of about the base axis of the spiral. The primary laths are sized to a structural depth sized to define the distance of spaced separation to be maintained between the spiral wound membrane units.

Spaced cross laths are arranged between primary laths to bridge the passageways formed between primary laths, and act to maintain the spaced disposition of the primary laths in their formation of passageways. The cross laths are sized to a structural depth which is less than the structural depth of the primary laths and are arranged to be spaced from opposing surfaces of opposing spiral wound membrane units. Thus, the lesser depth cross laths bridge the gap between primary laths to maintain the structural integrity of the passageways formed by the primary laths of the lattice, but do not engage the opposing surfaces of the opposing membrane units.

The novel lattice separator of the invention is embodied in open lattice and semi-open lattice form. In open lattice form, the primary and cross laths generally comprise narrow width, elongate structures which are arranged to form generally rectilinear lattice openings. In semi-open form, the primary and/or cross laths are generally formed from wider width elongate elements and though the lattice openings be generally rectilinear, they typically comprise curved surfaces and generally take on an oval and/or circular shape.

The novel lattice separator of the invention minimizes the amount of structural mass of the lattice which actually engages the opposing surfaces of opposing membrane units, without sacrificing the integrity of the structural separation of the units. In effect, the novel lattice structure enables a greater percentage of the surface area of the membranes in a passageway formed by the primary laths to be free from structural barriers to fluid permeation during filtration, while at the same time disrupting the flow pattern of fluid flowing through such passageways to improve the functional efficiency of the exposed membrane surfaces.

The novel cross lath structure increases operational efficiency of the exposed membrane surfaces by functioning as a plurality of fluid shears spaced along a passageway which divide, deflect and/or disrupt gross fluid flow through a passageway, directing fluid against the membrane surface in its passage through the unobstructed space between the cross laths and the surfaces of the opposing membrane units and reducing the presence of eddies. It is believed that the deflection of fluid flow against the membrane surfaces also causes the flexible membranes to deflect during pressurized flow and that membrane deflection, together with the directional changes in flow caused by the cross laths, intermittently changes the contact angle of fluid flow against the membrane units and/or flexes the filtration pores so as to flush solids and/or larger molecules which might otherwise accumulate on the surface of the filter and reduce the efficiency of permeation.

In a preferred embodiment, adjacent cross laths are arranged in different planes along a passageway to provide different sized unobstructed spacing between a cross lath and the surfaces of opposing membrane units. Thus, for example a cross lath along a passageway bridges two primary laths and is arranged to provide equal spacing between the cross lath and adjacent first and second opposing membranes. A next spaced cross lath between the primary laths is arranged to provide greater spacing between the cross lath and the first opposing membrane unit than the spacing between the second opposing membrane unit; and a third cross lath is arranged to provide lesser spacing between the cross lath and the first opposing membrane unit than the spacing between the opposing second membrane unit. The difference in spacing can be random amongst the plurality of cross laths between primary laths in a passageway, and can be selected between two or multiple spacing differentials.

In another preferred embodiment, the cross laths are shaped to a cross section which imposes particular fluid dynamics to the fluid flowing along the passageway. For example, the cross laths may be cylindrical, triangular, elliptical, rectilinear and the like in cross section to create various lamellar sheering effects upon the flowing fluid. In a preferred embodiment the cross section is in the shape of an air foil, lift wing or the like to generate turbulence. It should be understood that the cross laths can be formed in any convenient shape or may be a combination of different cross sectional shapes, generally it being preferred to adapt shapes which minimize the creation of eddies along the surface of the membrane units in the flow of fluid through the passageways.

Ultrafiltration membrane units comprising the spiral configuration of the present invention generally comprise a layered arrangement of opposing ultrafiltration permeable membrane layers, sandwiched over a central layer of support material. The support material functionally supports the membranes in spaced relationship and maintains a passageway between the ultrafiltration membranes into which permeate filtering through the membranes collects, and provides a vehicle through which the collected permeate is transported from a membrane unit to an appropriate outlet(s) from the unit.

In a typical spiral membrane configuration of the invention, open ends of a plurality, e.g. two or more, of membrane units are connected generally longitudinally along the periphery of a hollow tube, spaced from each other. The hollow tube comprises one or more openings to its interior longitudinally along its periphery, aligned to receive permeate passing along the sandwiched central support material of a unit and pass such permeate to the hollow of the tube. The membrane units are spiraled around the tube, with the lattice structure of the invention separating the membrane units and providing a plurality of primary lath-formed fluid passageways arranged spaced from and generally in the direction of the longitudinal axis of the hollow tube. The spiral membrane is contained in a housing which enables gross flow of the fluid being treated from intake at one end of the primary lath-formed fluid passageways across the membrane units to outlet at an opposite end of such fluid passageways.

In a preferred embodiment of the invention, the housing comprises a rounded chamber in which the spiral wound membrane arrangement is supported, comprising a header area at the intake end of the chamber to enable gross flow distribution through the passageways. In a particularly preferred embodiment, the header is rounded and contains one or more deflection vanes, arranged at a trapezoidal passageway, adjacent the fluid intake to the header which deflects fluid flow being input to the header and directs fluid about the header in such manner as to resist the creation of selective flow channels through any one or more longitudinal passageways formed by the primary laths, positioned adjacent the intake.

BRIEF DESCRIPTION OF THE DRAWINGS

The nature and mode of operation of the present invention will now be more fully described in the following detailed description taken with the accompanying drawings wherein.

DESCRIPTION OF THE PREFERRED EMBODIMENT

It will be understood at the outset that the membrane assembly of the present invention possesses utility generally in filtration applications but is particularly preferred for use in ultrafiltration processes wherein small molecule fluids such as water and the like is to be separated from larger molecule liquids.

Figure 1:
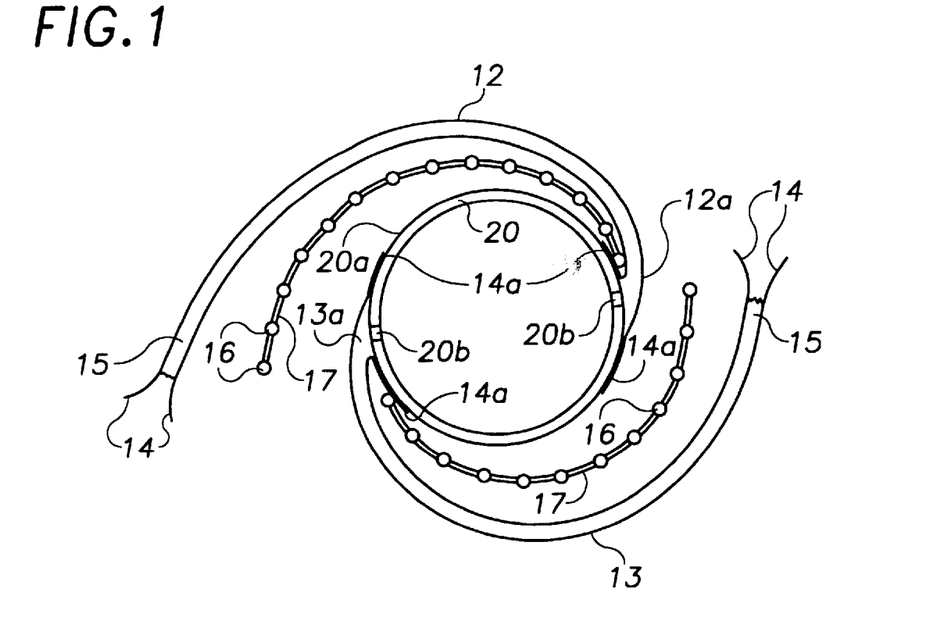
FIG. 1 is a diagrammatic top plan view of a spiral membrane arrangement of the invention.

FIG. 1 is a partial sectional, diagrammatic top plan view taken of a partially unwound central winding segment of a typical spiral membrane configuration of the invention. Therein, two membrane units 12 and 13 are connected at open ends 12a and 13a respectively longitudinally along the periphery 20a of hollow tube 20, spaced from each other. Each membrane unit comprises thin outer ultrafiltration membrane layers 14 which sandwich over and sealingly encapsulate a supporting structure 15 except for open ends 12a and 13a. A hollow tube 20 is connected to open ends 12a and 13a respectively of membrane units 12 and 13, and comprises one or more openings 20b to its interior arranged longitudinally along the tube. Open ends 12a and 13a of the membrane unit are connected to the tube by gluing ends 14a of sandwiching membranes 14 to the periphery of tube 20, the ends being aligned adjacent opening(s) 20b and positioned to align support structure 15 opposite opening(s) 20b and provide a passageway through tube 20 to enable permeate to pass along the sandwiched central support structure of a unit, to the hollow of the tube. The membrane units are spiraled around the tube, with lattice separators, comprising primary laths 16 and cross laths 17, being arranged to maintain the membrane units spaced from each other sufficient to enable fluid flow along the membrane surfaces of the membrane units. In FIG. 1, both primary laths 16 and cross laths 17 are illustrated as comprising a circular cross section, thus the structural depth of the laths and their width is the same. The lattice is seen as an open lattice structure, comprising generally rectilinear lattice openings. Cross laths 17 have a smaller cross-section than primary laths 16 and are positioned relative to primary laths 16 so as to provide about equal spacing from the surfaces of the opposing membrane units to the periphery of a cross lath positioned therebetween.

Ultrafiltration membrane units especially useful in the invention comprise spiral wound configured, cartridge type membrane elements which resist flow therethrough of molecules having a molecular weight greater than water. Typically such membranes units comprise one or more distinct membrane sheets, generally thin film membrane sheets, laid over each side of a structural support material and arranged to encapsulate the support material except for an open end. It should be understood that any means of applying a membrane layer, including treatment of the surface of the support material is contemplated as within the invention. An operating pH range of about 2–13, an operating pressure range of from about 40–400 psi and an operating temperature range up to about 175° Fahrenheit is generally preferred for the separation of fluid mixtures. Polysulfone, polynitrile, polyamide and cellulose base membranes and the like have been found to be particularly suitable for the ultrafiltration assembly of the invention.

The support structure sandwiched by the membrane layers functionally maintains a passageway between the ultrafiltration membranes into which the permeate filtering through the membranes collects, and provides a vehicle through which the collected permeate is transported within a membrane unit to an appropriate outlet(s) from the unit. The support structure generally comprises a porous material which is selected for its ability to collect and transport fluid permeate along its length, while maintaining its structural integrity and the structural integrity of the membranes sandwiched thereover. The support material is generally a fibrous composite which does not absorb the permeate fluid, but generally exhibits good wicking characteristics which enable a flow of permeate to an open end of the unit, urged by a pressurized flow of permeate through the membrane layers and along the support structure to a lessor pressurized opening at the open end of the unit. In a preferred embodiment, the support structure is selected for a combination of factors including its resistance to swelling, compacting and degradation. In a still further embodiment the support material comprises sandwiched sheets of fibrous material.

Figure 2:
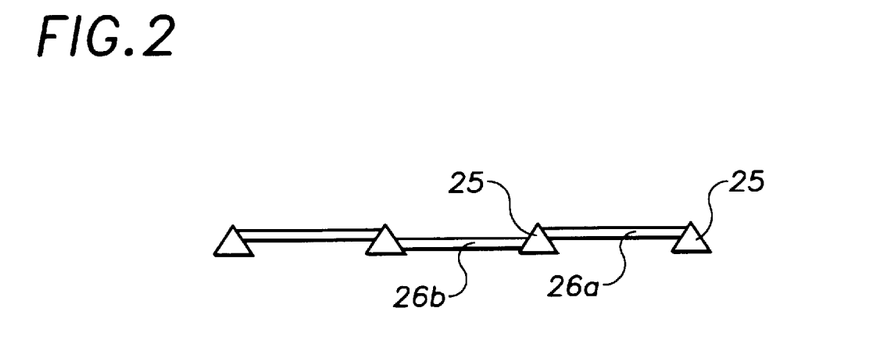
FIG. 2 is a top plan view of a lattice separator of the invention.

FIG. 2 illustrates another configuration of an open lattice separator of the invention, wherein a top plan view of a lattice separator is shown as comprising generally triangular primary laths 25, separated by generally flat cross laths 26. Cross laths 26a are illustrated as being offset toward the apex of the triangular laths and cross laths 26b as being offset toward the base of the triangular laths, providing unequal spacing between the surfaces of the opposing membrane units and the opposing periphery of a cross lath spiral wound therebetween.

Figure 3:
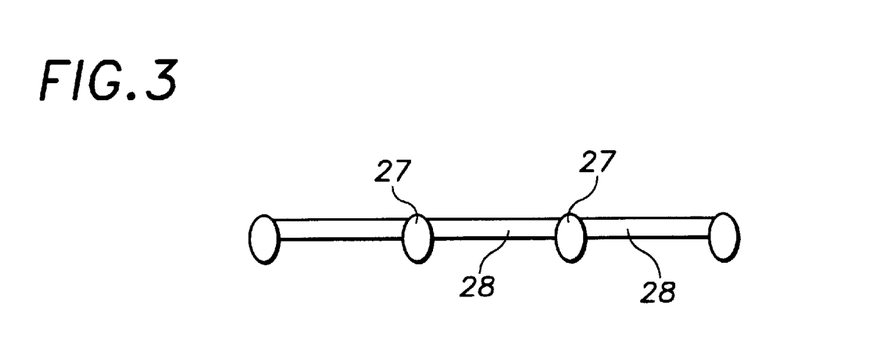
FIG. 3 is a top plan view of a further lattice separator of the invention.

FIG. 3 illustrates still another configuration of an open lattice separator of the invention, wherein a top plan view of a separator fragment is shown as comprising generally elliptical cross section primary laths 27, separated by generally elliptical cross section cross laths 28. The elliptical cross laths are arranged with their elongate elliptical axis being about parallel to the axis of the primary laths. Cross laths 28 are illustrated as being offset toward one side of the primary laths, providing a greater space between the cross laths and a first opposing membrane unit than the spacing between the cross laths and a second opposing membrane unit.

Figure 4:
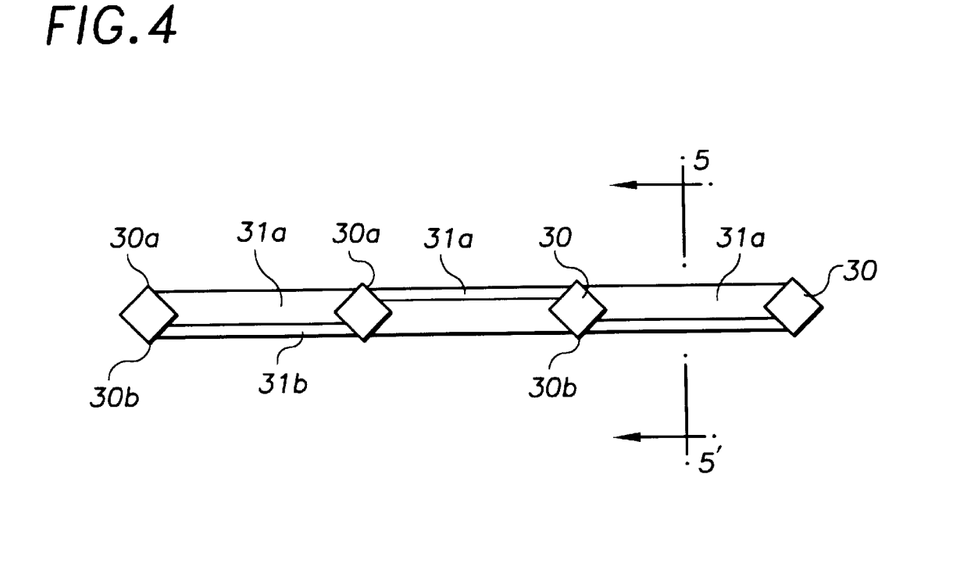
FIG. 4 is a plan view of still another lattice separator of the invention.
Figure 5:
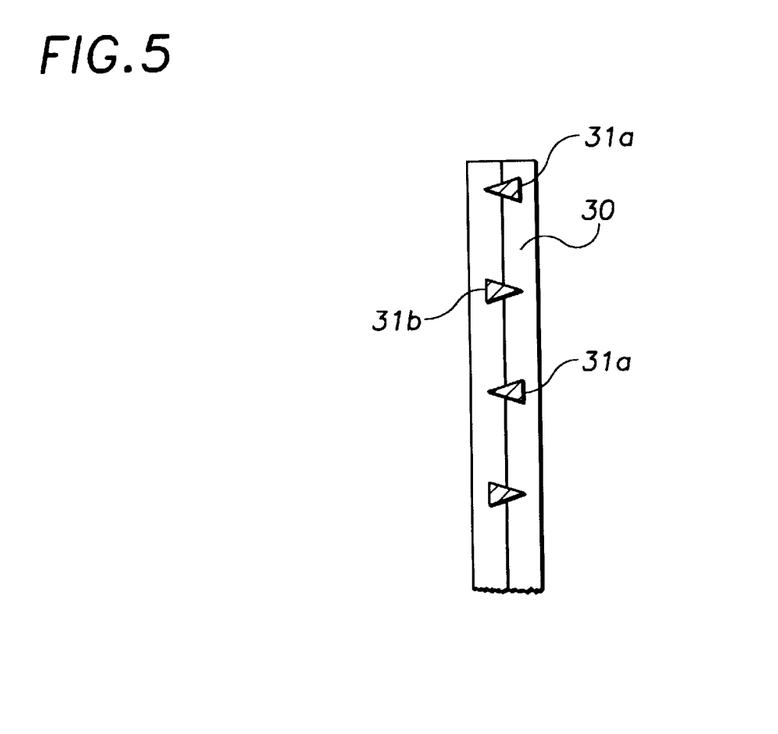
FIG. 5 is a sectional view of the lattice separator of FIG. 4, taken along about line 5–5'.

FIGS. 4 and 5 illustrate yet another configuration of a lattice separator of the invention, wherein an enlarged top plan view of a lattice separator is shown as comprising generally rectangular primary laths 30, separated by generally wing shaped cross laths 31a and 31b. Primary laths 30 are arranged so that edges 30a,30b engage the surface of opposing membrane surfaces and providing a minimum structural contact with the membrane surfaces. Cross laths 31a are illustrated as being offset toward a first membrane unit and cross laths 31b offset toward the opposing membrane unit, providing a periodic arrangement of unequal spacing between the surfaces of the opposing membrane units and the opposing periphery of a cross lath positioned therebetween.

Figure 6:
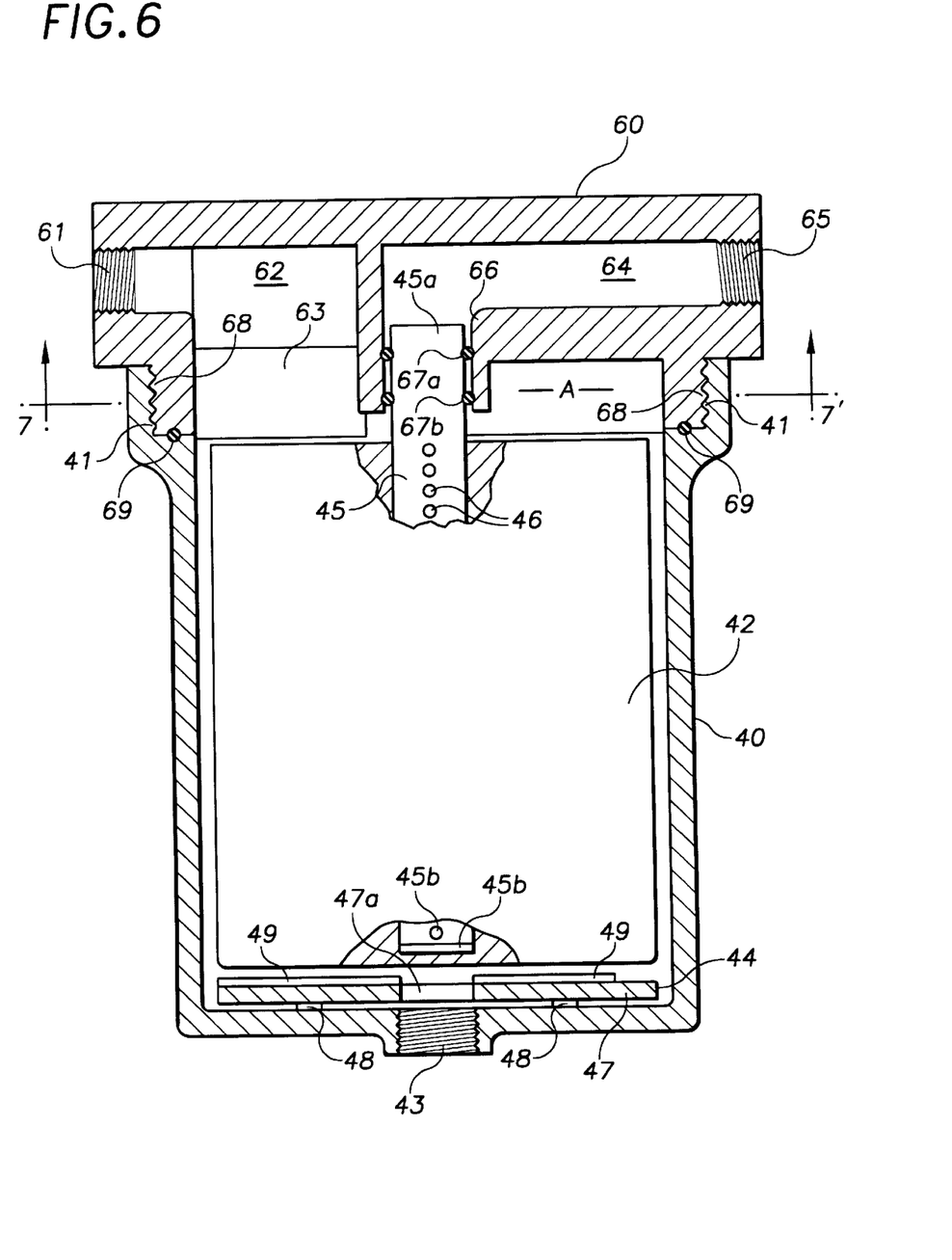
FIG. 6 is a front, partial sectional view of a membrane assembly of the invention.
Figure 7:
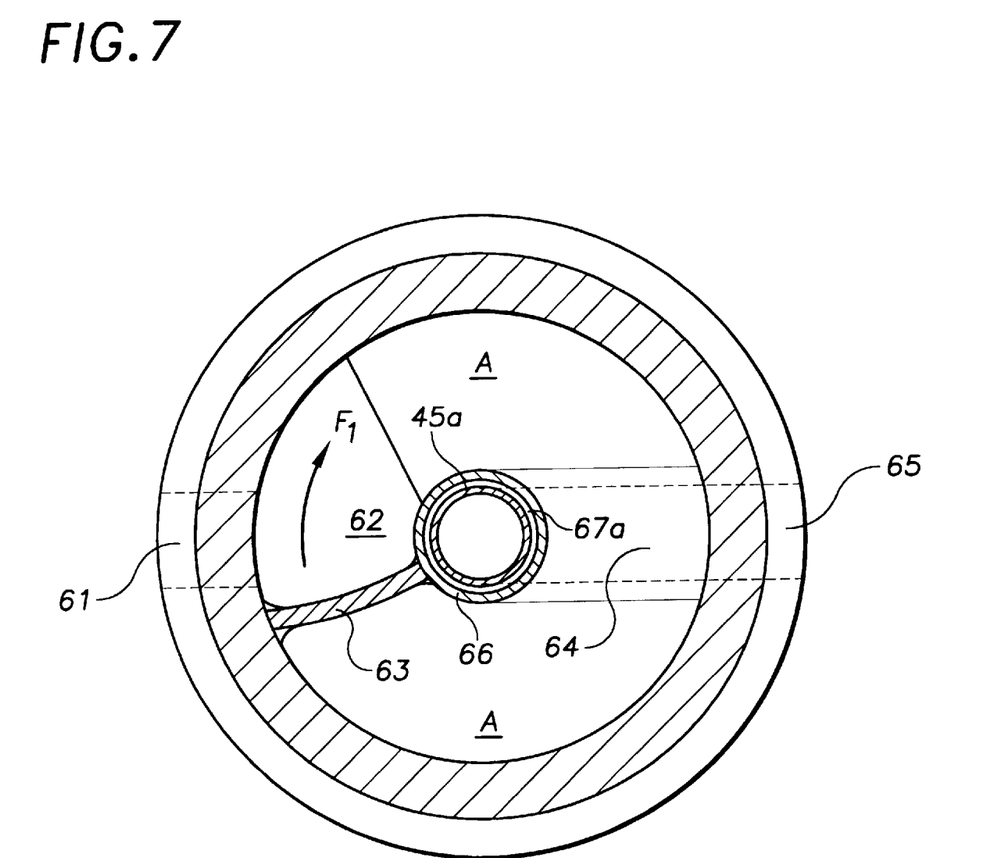
FIG. 7 is a cross sectional view of a membrane assembly of FIG. 6 taken along about line 7–7'.

FIGS. 6 and 7 illustrate a typical membrane cartridge assembly of the invention. Therein is shown an ultrafiltration cartridge housing comprising generally cylindrical canister 40 and mating canister top 60.

Canister top 60 is generally hard mounted to the ultrafiltration device and comprises an inlet 61 for influent to be treated, influent passageway 62, distribution vane 63, permeate outlet passageway 64, permeate outlet 65, membrane tube receiver 66, membrane tube ring seals 67a and 67b, canister thread mount 68, and canister ring seal 69.

Canister 40 contains mating threads 41 for removable mounting to thread mount 68 of canister top 60, being fluid sealed by elastomeric ring 69. Canister 40 is sized to accept a spiral wound membrane element 42, which comprises two or more membrane units as illustrated in FIG. 1, connected at their open ends longitudinally along the periphery of hollow tube 45. Hollow tube 45 is illustrated as having capped end 45b and open end 45a, which inserts into membrane tube receiver 66 of canister top 60 and is sealingly retained therein by ring seals 67a and 67b. Tube 45 comprises a plurality of openings 46 to its interior. Openings 46 are arranged longitudinally along the tube and are aligned with the support/transport material sandwiched between the membranes of the membrane units to provide a passageway for permeate collected by the support/transport material. Thus, permeate flows through the sandwiching membranes to the support/transport material therebetween and from the support/transport material of the membrane units through openings 46 to the hollow interior of tube 45. Capped end 45b of tube 45 prevents flow of permeate from end 45b, permeate collects in the hollow interior of tube 45 and overflows through end 45a into outlet passageway 64 of canister top 60 and through outlet 65 to recovery and/or waste.

In the illustrated embodiment, the bottom of canister 40 comprises treated fluid outlet 43, and spiral wound filter element 42 is supported off the bottom of canister 40 by anti-telescoping member 44. Anti-telescoping member 44 is illustrated as comprising a generally round base 47, having a central opening 47a adjacent fluid outlet 43, a plurality of support feet 48 arranged to maintain base 47 spaced from the interior bottom of canister 40, and a plurality of radial spaced vanes 49, which extend outwardly from about the longitudinal axis of the filter element and are arranged to support filter element 42 spaced from base 47 and form channels for the flow of treated fluid toward central opening 47a.

In the operation of the membrane filter assembly, influent fluid to be treated passes through inlet 61 into influent passageway 62. Passageway 62 is an enlarged trapezoidal area positioned after a smaller influent inlet. Fluid flows into the enlarged area and is directed downwardly and angularly outward toward the fill area "A" which comprises the space between the top of the filter element and the mass of the top. Diverter vane 63 is positioned adjacent the inlet opening and extends in a radius from membrane tube retainer 66 to the interior periphery of canister top 60, the vane also extending axially downward from the inlet to engagement with the top of filter element 42 to provide a barrier weir to fluid flow in the direction of the vane. Fluid flowing from passageway 62 angularly outward against the deflector vane is deflected angularly inwardly, tending to create a circular flow path, in the direction of arrow F1, within fill area "A". It is believed this circular flow path resists the formation of a narrow channeled flow of influent directly downward from the inlet toward the bottom of canister 40 and provides a more consistent and thus more efficient flow of fluid downward between the membrane units.

Figure 8:
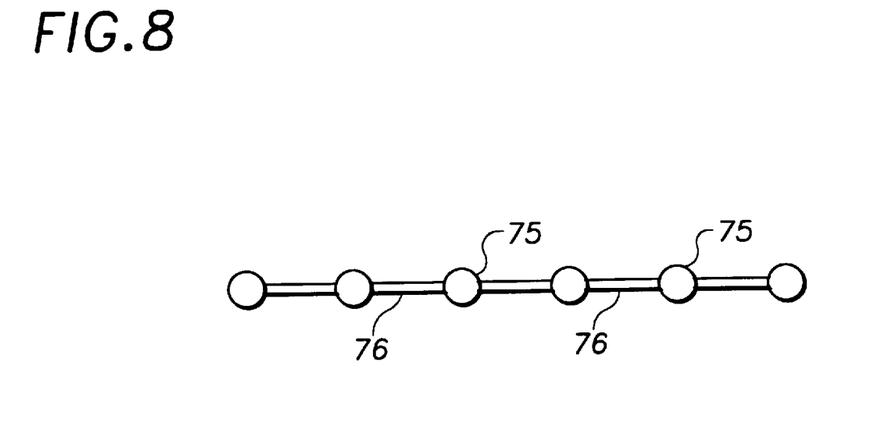
FIG. 8 is a plan view of still another lattice separator of the invention.
Figure 9:
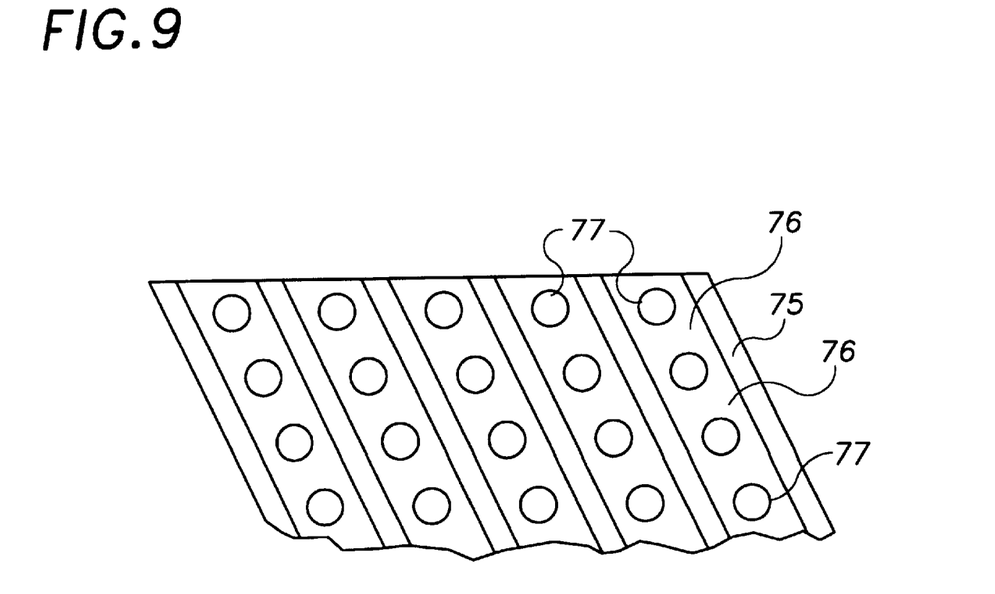
FIG. 9 is a sectional view of the lattice separator of FIG. 8, taken along about line 9–9'.

FIGS. 8 and 9 illustrate a semi-open lattice structure wherein primary laths 75 are of circular cross-section and cross laths 76 comprise a plate arrangement with a hole 77 therethrough. In this embodiment, the primary laths are arranged to provide passageways which are angled in a concentric spiral to the base axis, generally extending in the direction of about the base axis.

I claim:

1. A filtration membrane arrangement comprising:
   at least one membrane unit, said at least one unit comprising opposing layers of flexible filtration membrane sandwiched over a support structure which is arranged to maintain said opposing layers in spaced opposing relationship and provide a central conduit for the passage of fluid to an open end of said at least one unit;
   said at least one membrane unit being spiral wound about a base axis wherein said open end is arranged adjacent said base axis, with windings of said at least one unit being maintained in spaced opposing relationship to each other by a separator comprising spaced apart elongate primary laths, bridged by cross laths;
   said primary laths being arranged to extend in about the direction of said base axis, sized to a structural depth which defines the distance of said spaced opposing relationship of said windings of said at least one spiral wound membrane unit by engaging opposing surfaces of said at least one wound membrane unit, and being spaced from each other to form a plurality of distinct elongate passageways between opposing surfaces of said windings, arranged in about the direction of the base axis of the spiral;
   wherein said cross laths, bridge said elongate passageways, are sized to a structural depth less than the structural depth of said primary laths and are arranged to be spaced from engaging opposing surfaces of said at least one spiral wound membrane unit.

2. The membrane arrangement of claim 1 wherein said cross laths are unequally spaced from opposing surfaces of spiral wound membrane units.

3. The membrane arrangement of claim 1 wherein said cross laths are equally spaced from opposing surfaces of spiral wound membrane units.

4. The membrane arrangement of claim 1 wherein said primary laths have a generally circular cross section.

5. The membrane arrangement of claim 1 wherein said primary laths have a generally oval cross section.

6. The membrane arrangement of claim 1 wherein said primary laths have a triangular cross section.

7. The membrane arrangement of claim 1 wherein said primary laths have a rectilinear cross section.

8. The membrane arrangement of claim 1 wherein said cross laths have a cross sectional configured as an airfoil.

9. The membrane arrangement of claim 1 comprising an open lattice separator.

10. The membrane arrangement of claim 9 wherein the primary and cross laths generally comprise narrow width, elongate structures which are arranged to form generally rectilinear lattice openings.

11. The membrane arrangement of claim 1 comprising a semi-open lattice separator.

12. The membrane arrangement of claim 11 wherein the cross laths comprise curved surfaces and form curved lattice openings.

13. The membrane arrangement of claim 1 wherein said support structure comprises a porous material.

14. The membrane arrangement of claim 1 wherein said support structure comprises a fibrous material.

15. The membrane arrangement of claim 1 comprising a plurality of said membrane units.

16. The membrane arrangement of claim 1 comprising two of said membrane units having open ends arranged adjacent said base axis.

17. In a membrane assembly comprising a housing, a removable cylindrical filter element, a fluid inlet, fluid outlet and a permeate outlet, the improvement comprising:
   said housing comprising a cylindrical canister which is removably mounted to a top;
   said filter element comprising a spiral wound membrane with a central tube, having a capped end, for collection of filtered permeate, and being housed in said cylindrical canister;
   said top comprising said fluid inlet and said permeate outlet, and having a passageway which connects with an open end of said central tube for passage of filtered permeate from said open end to said permeate outlet;
   wherein said top, comprises a deflector vane, positioned about adjacent said fluid inlet and arranged to extend radially outward from about the longitudinal axis of said cylindrical filter element to about the periphery of said filter element and extend axially between said fluid inlet and an end of said filter element, said deflector vane being sized to deflect flow of fluid from said fluid inlet to a direction about perpendicular to said longitudinal axis.

18. The membrane assembly of claim 17 wherein said top comprises a passageway arranged adjacent said fluid inlet between said deflector vane and said fluid inlet, having a trapezoidal cross-section.

19. An open lattice separator for maintaining spaced separation of one or more spiral wound filtration units comprising:
   a plurality of elongate primary laths, said primary laths being sized to a structural depth which defines a desired distance of spaced opposing relationship of spiral wound membrane units to be maintained by engaging opposing surfaces of said opposing membrane units, and being held in spaced about parallel relation to each other by a plurality of spaced apart cross laths;

wherein said cross laths bridge said spacing between elongate passageways, are sized to a structural depth less than the structural depth of said primary laths and connect to said primary laths offset from the structural depth of said primary laths.

20. The membrane arrangement of claim 19 wherein the cross laths comprise curved surfaces and form curved openings through said lattice.

* * * * *